United States Patent
Saito (10) Patent No.: US 11,415,785 B2
(45) Date of Patent: Aug. 16, 2022

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Shinichiro Saito, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/022,705

(22) Filed: Sep. 16, 2020

(65) Prior Publication Data

US 2021/0088762 A1    Mar. 25, 2021

(30) Foreign Application Priority Data

Sep. 20, 2019 (JP) .............................. JP2019-171676

(51) Int. Cl.
  *G02B 15/14* (2006.01)
  *G02B 3/04* (2006.01)
(52) U.S. Cl.
  CPC ........... *G02B 15/1425* (2019.08); *G02B 3/04* (2013.01)
(58) Field of Classification Search
  CPC .... G02B 15/1425; G02B 3/04; G02B 15/142; G02B 13/04; G02B 13/002; G02B 13/006
  See application file for complete search history.

(56) References Cited

U.S. PATENT DOCUMENTS

| | | | |
|---|---|---|---|
| 2009/0323205 A1* | 12/2009 | Park .................... | G02B 9/12 359/753 |
| 2011/0310496 A1 | 12/2011 | Kubota et al. | |
| 2011/0317282 A1* | 12/2011 | Kimura ................ | G02B 3/04 359/716 |
| 2013/0265653 A1* | 10/2013 | Kimura ................ | G02B 3/04 359/716 |
| 2014/0125858 A1 | 5/2014 | Sugita | |
| 2018/0210178 A1 | 7/2018 | Saito et al. | |

FOREIGN PATENT DOCUMENTS

| | | |
|---|---|---|
| JP | 2008-145586 A | 6/2008 |
| JP | 2015-152851 A | 8/2015 |
| JP | 2015-225297 A | 12/2015 |
| JP | 2016-066059 A | 4/2016 |
| JP | 2018-116210 A | 7/2018 |
| WO | 2016/024412 A1 | 2/2016 |

* cited by examiner

*Primary Examiner* — Alicia M Harrington
(74) *Attorney, Agent, or Firm* — Canon U.S.A., Inc. IP Division (57) ABSTRACT

An optical system LO includes in this order from an object side to an image side, a first lens unit FL, an aperture stop SP, and a second lens unit RL having a positive refractive power. The first lens unit FL includes at least three negative lenses including in order from the object side to the image side, negative lenses (G1N), (G2N), and (G3N). At least one lens surface of the negative lenses (G1N), (G2N), and (G3N) is an aspherical surface that satisfies a predetermined conditional inequality.

20 Claims, 8 Drawing Sheets

OPTICAL SYSTEM AND IMAGE PICKUP APPARATUS INCLUDING THE SAME

BACKGROUND OF THE DISCLOSURE

Field of the Disclosure

The aspect of the embodiments relates to optical systems suitable for digital video cameras, digital still cameras, broadcasting cameras, silver-halide film cameras, and monitoring cameras.

Description of the Related Art

In recent years, the number of pixels of a solid-state image pickup element, such as a charge-coupled device (CCD) sensor or complementary metal oxide semiconductor (CMOS) sensor, in digital still cameras and video cameras is increasing, and there is a demand for higher optical performance from optical systems in image pickup apparatuses using such image pickup elements.

Meanwhile, a retrofocus type image pickup optical system as discussed in United States Patent Application Publication No. 2018/0210178 is known as an image pickup optical system having a wide angle of view where a half angle of view is greater than 45 degrees.

In general, since lens units in a retrofocus type optical system are asymmetrical from each other to a stop, aberrations such as field curvatures, significant distortions, and chromatic aberrations of magnification occur, and it therefore becomes difficult to correct these aberrations. Especially in a case where an angle of view is increased, negative refractive power of an object-side lens is increased, and consequently this results in an increase in the above described aberrations.

In order to appropriately correct distortions and field curvatures in a retrofocus type optical system and realize high optical performance, it is important to set a lens structure of an object-side lens unit having negative refractive power as appropriate.

While, in United States Patent Application Publication No. 2018/0210178, the refractive power of each lens is reduced and aberrations, such as chromatic aberrations of magnification, field curvatures, and distortions are appropriately corrected, the issue of size reduction of the optical system still remains.

SUMMARY OF THE DISCLOSURE

According to the aspect of the embodiments, there is provided an optical system includes in this order from an object side to an image side, a first lens unit, an aperture stop, and a second lens unit having a positive refractive power, in which the first lens unit includes at least three negative lenses including in order from the object side to the image side, a negative lens (G1N), a negative lens (G2N), and a negative lens (G3N), in which at least one lens surface of the negative lens (G1N), the negative lens (G2N), and the negative lens (G3N) is an aspherical surface, and in which the following conditional inequalities are satisfied:

$0.700 < Rb/Rr < 0.994$, $0.80 < L1S/f2 < 1.20$, and $0.45 < SK/f2 < 0.65$, where $Rb$ is a radius of curvature of a paraxial spherical surface of the aspherical surface, $Rr$ is a distance between a center of curvature of the paraxial spherical surface of the aspherical surface and the aspherical surface in a direction of a half-open angle of 50 degrees about the center of curvature with respect to an optical axis, $L1S$ is a distance from a vertex of a lens surface closest to an object in the first lens unit to the aperture stop, $f2$ is a focal length of the second lens unit, and $SK$ is a back focus of the optical system.

Further features of the disclosure will become apparent from the following description of embodiments with reference to the attached drawings.

DESCRIPTION OF THE EMBODIMENTS

Figure 1:
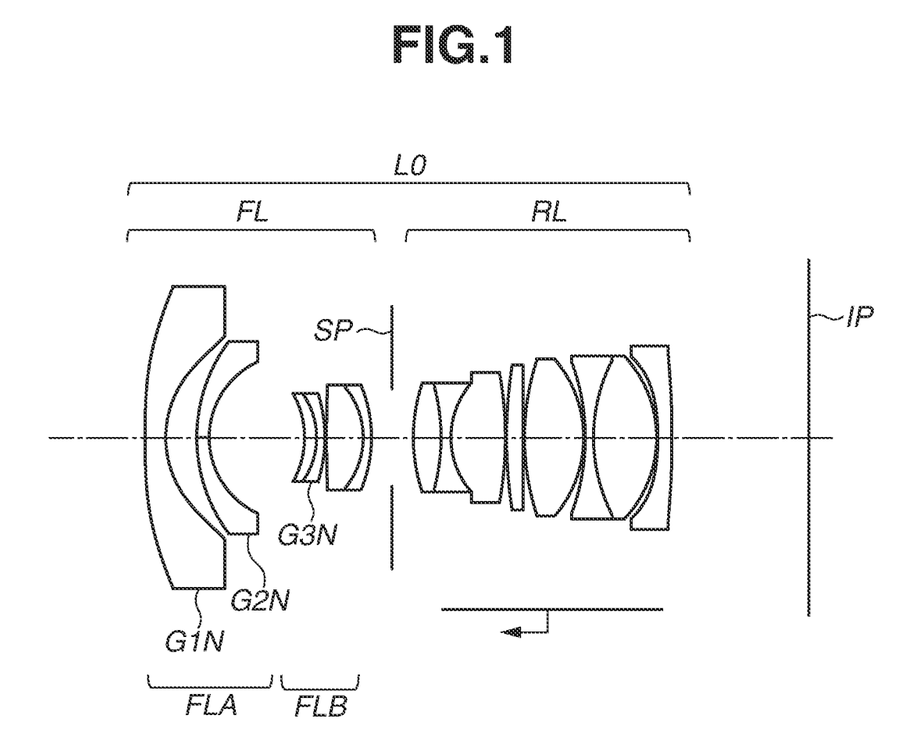
FIG. 1 is a cross-sectional view of an optical system according to a first embodiment.
Figure 2:
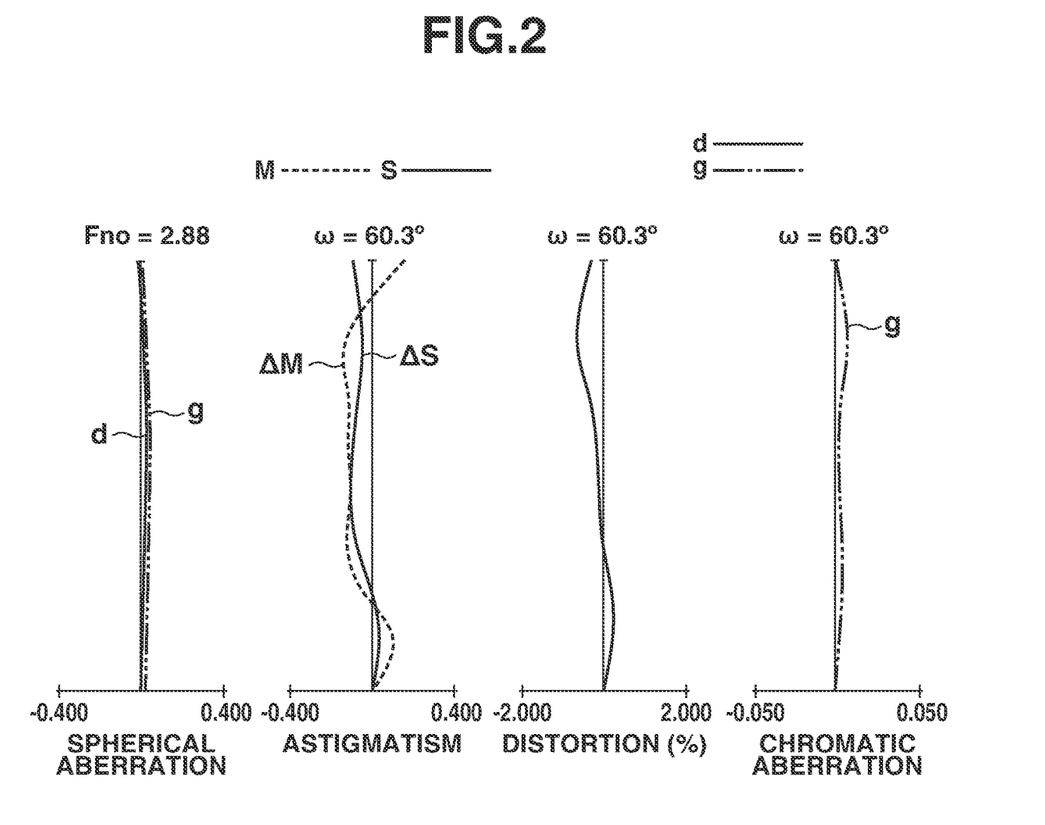
FIG. 2 is an aberration diagram of the optical system according to the first embodiment.
Figure 3:
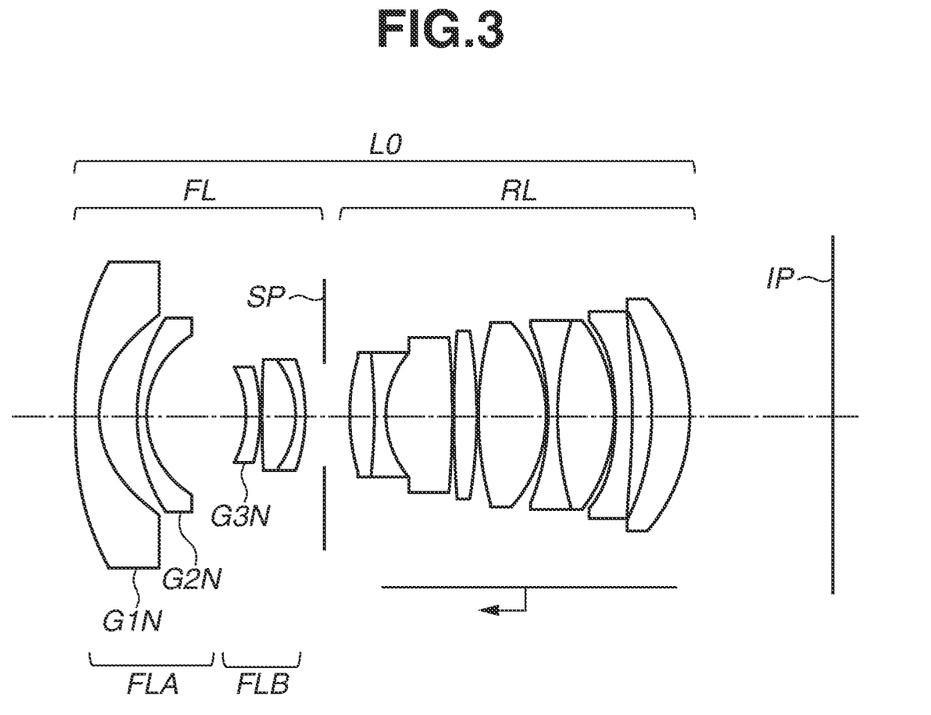
FIG. 3 is a cross-sectional view of an optical system according to a second embodiment.
Figure 4:
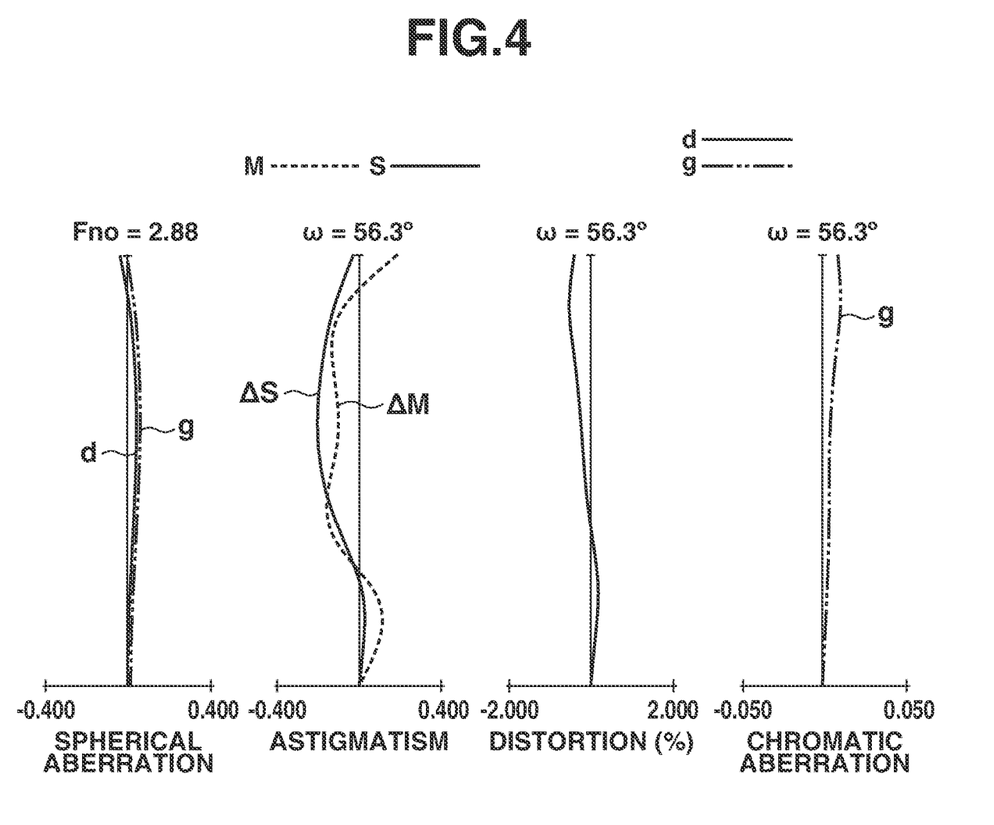
FIG. 4 is an aberration diagram of the optical system according to the second embodiment.
Figure 5:
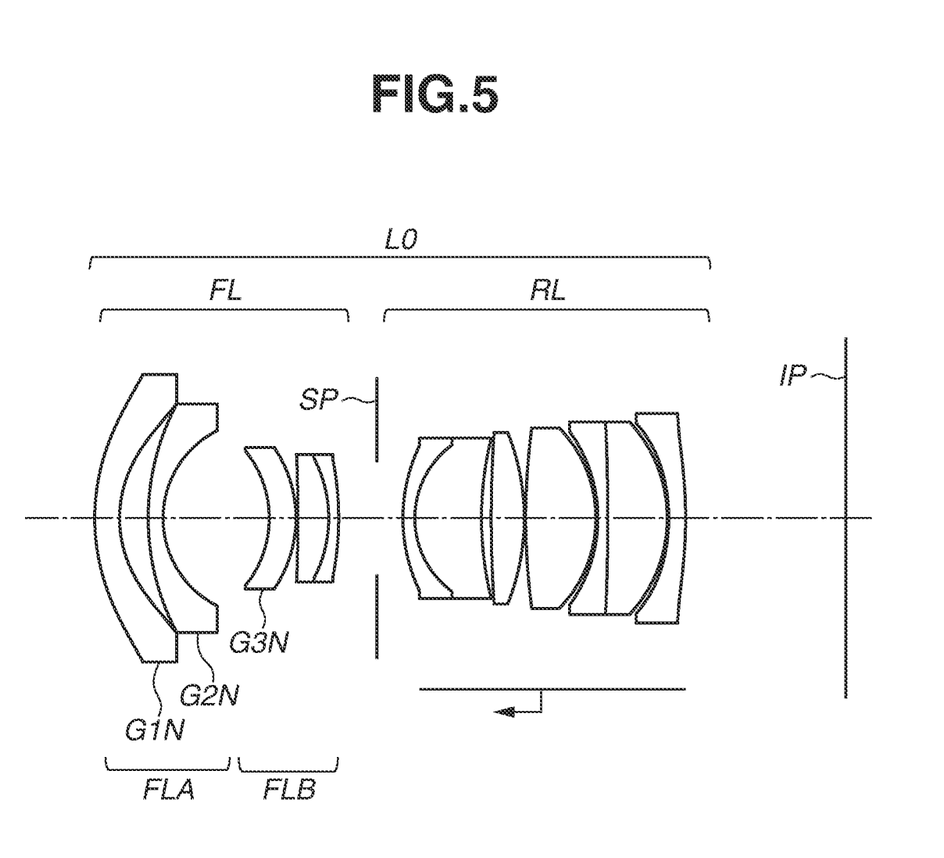
FIG. 5 is a cross-sectional view of an optical system according to a third embodiment.
Figure 6:
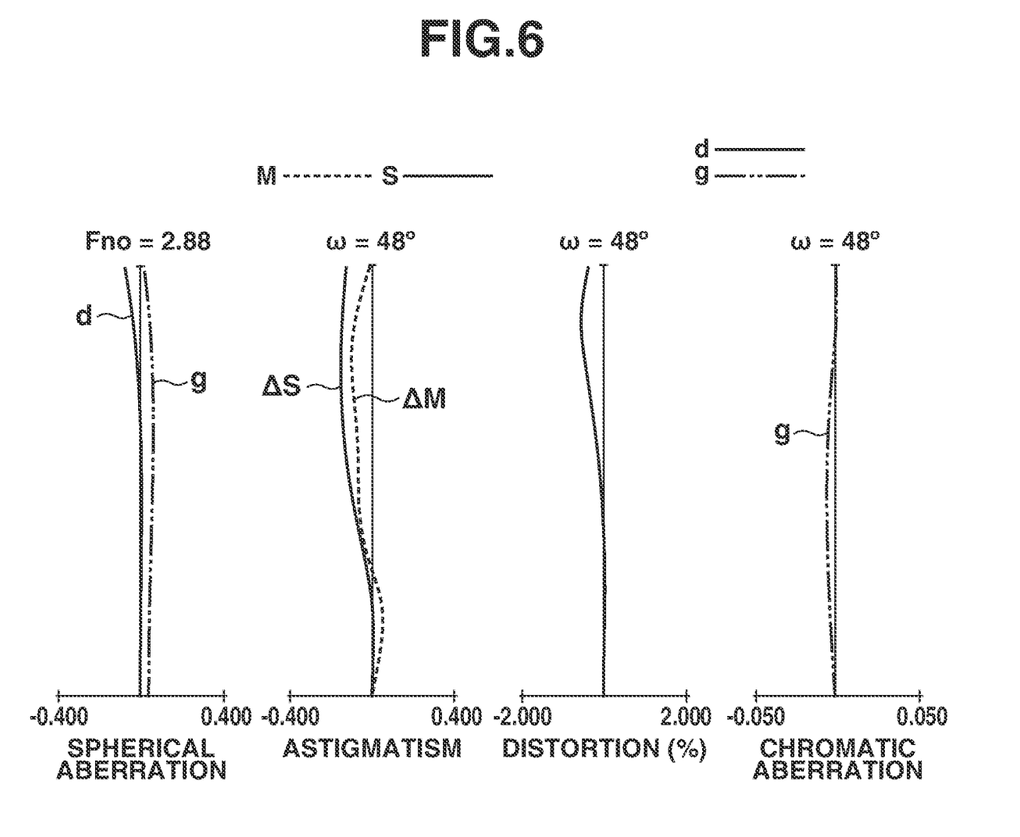
FIG. 6 is an aberration diagram of the optical system according to the third embodiment.

Optical systems and image pickup apparatuses including the same according to various embodiments of the disclosure will be described below with reference to the attached drawings. Each of the embodiments of the disclosure described below can be implemented solely or as a combination of a plurality of the embodiments. Also, features from different embodiments can be combined where necessary or where the combination of elements or features from individual embodiments in a single embodiment is beneficial FIGS. 1, 3, and 5 are cross-sectional views illustrating lenses of an optical system at infinity focus according to first to third embodiments of the disclosure. FIGS. 2, 4, and 6 are aberration diagrams of the optical systems according to the first to third embodiments. The optical systems according to the embodiments are an optical system for use in image pickup apparatuses, such as digital video cameras, digital still cameras, broadcasting cameras, silver-halide film cameras, and monitoring cameras.

In each cross-sectional view of the lenses, the left-hand side is an object side, and the right-hand side is an image side. Each optical system according to the embodiments includes a plurality of lens units. In the embodiments described in the present specification, each lens unit may consist of a single lens or a plurality of lenses.

A primary stop (aperture stop) SP in each cross-sectional view of the lenses determines an F-number (Fno) (limits light flux). In a case where an optical system according to an embodiment of the disclosure is used as an image pickup optical system of a digital still camera or a digital video camera, an image pickup surface of a solid-state image pickup element (photoelectric conversion element), such as a charge-coupled device (CCD) sensor or complementary metal oxide semiconductor (CMOS) sensor, is disposed on an image plane IP. In a case where an optical system according to an embodiment of the disclosure is used as an image pickup optical system of a silver-salt film camera, a photosensitive surface corresponding to a film surface is disposed on the image plane IP.

Each optical system LO according to the embodiments includes a first lens unit FL, the aperture stop SP, and a second lens unit RL having positive refractive power, disposed in order from the object side to the image side. In focusing from infinity to short distance, the second lens unit RL is moved in the direction of an arrow in FIG. 1, 3, or 5.

While each optical system LO according to the embodiments is a single focus lens, the disclosure is not limited to this configuration. Alternatively, the optical system LO can be a zoom lens. In a case where the optical system LO is a zoom lens, a condition described below is satisfied at a wide angle end.

FIGS. 2, 4, and 6 are aberration diagrams of the optical systems LO according to the first to third embodiments. In each spherical aberration diagram, Fno is the F-number, and the amount of spherical aberration at the d-line (wavelength: 587.6 nm) and the amount of spherical aberration at the g-line (wavelength: 435.8 nm) are illustrated. In each astigmatism diagram, S is the amount of astigmatism in a sagittal image plane, and M is the amount of astigmatism in a meridional image plane. In each distortion diagram, the amount of distortion at the d-line is illustrated. In each chromatic aberration diagram, the amount of chromatic aberration at the g-line is illustrated. Further, ω is a half angle of view (degrees) of image pickup.

Next, a feature structure of the optical systems LO according to the embodiments will be described below.

The first lens unit FL of each of the optical systems LO according to the embodiments includes at least three negative lenses including a negative lens G1N (first negative lens), a negative lens G2N (second negative lens), and a negative lens G3N (third negative lens) disposed in order from the object side to the image side. The negative lens G1N is the closest negative lens to the object among the negative lenses of the first lens unit FL. The negative lens G2N is the second closest negative lens to the object among the negative lenses of the first lens unit FL. The negative lens G3N is the third closest negative lens to the object among the negative lenses of the first lens unit FL.

In order to reduce aberrations and realize appropriate optical performance in a case where an angle of view is increased, an aspherical surface lens is used to reduce aberrations. In such a case, the position of an aspherical surface in an optical system, the shape of a lens surface to which the aspherical surface is applied, and the amount of the aspherical surface are defined as appropriate. In the optical systems LO according to the embodiments, at least one lens surface of the negative lenses G1N, G2N, and G3N has an aspherical surface (hereinafter, referred to as "first aspherical surface"), and the shape of the aspherical surface is defined as appropriate. Furthermore, the structure of the second lens unit RL is designed as appropriate so that aberrations are appropriately corrected while the size of the optical system is reduced.

Specifically, the optical systems LO according to the embodiments satisfy the following conditional inequalities:

$$0.700 < Rb/Rr < 0.994 \quad (1),$$

$$0.80 < L1S/f2 < 1.20 \quad (2), \text{ and}$$

$$0.45 < SK/f2 < 0.65 \quad (3).$$

In the equalities, Rb is the radius of curvature of a paraxial spherical surface of the first aspherical surface, Rr is the distance between the first aspherical surface and the center of curvature in the direction of a half-open angle of 50 degrees about the center of curvature of the paraxial spherical surface of the first aspherical surface with respect to an optical axis, L1S is the distance from a surface vertex of the lens closest to the object in the first lens unit FL to the aperture stop SP, f2 is a focal length of the second lens unit RL, and SK is a back focus of the optical system LO.

Figure 8:
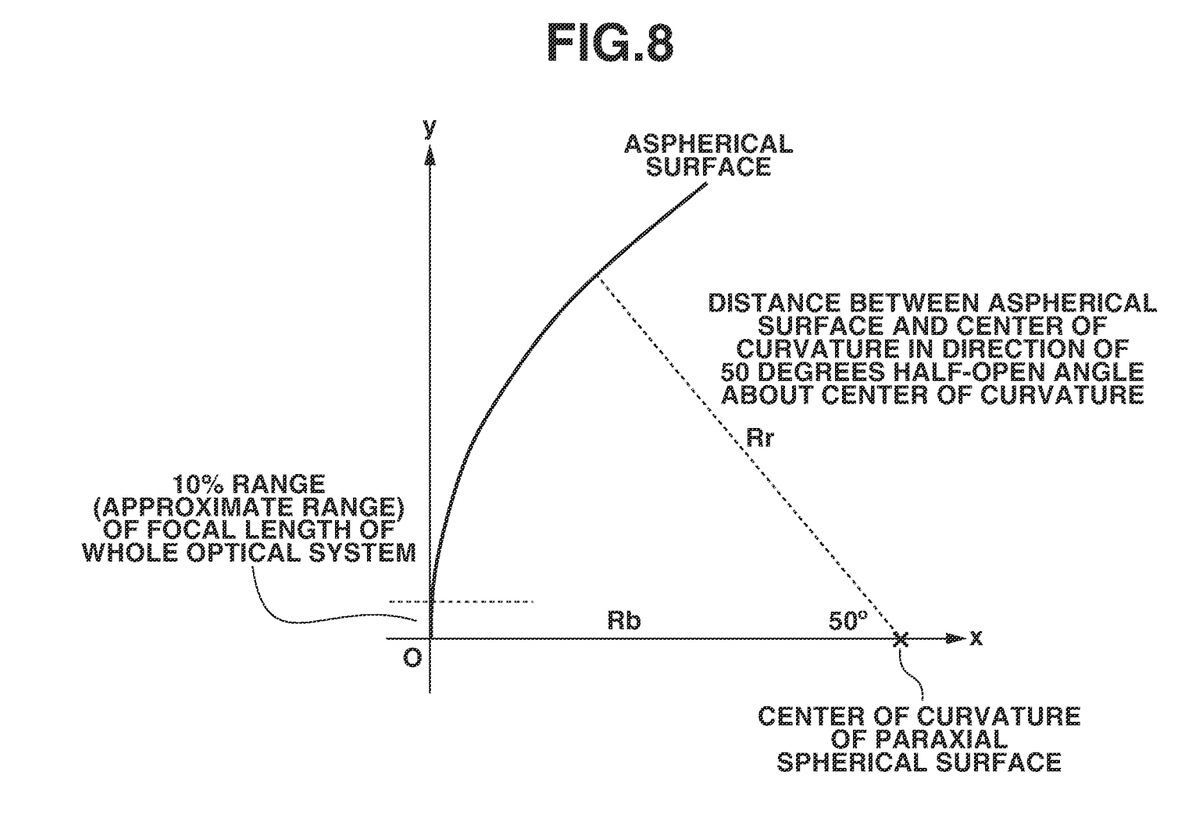
FIG. 8 is a diagram illustrating a method of calculating a conditional inequality with respect to an aspherical surface.

The radius of curvature Rb and the distance Rr will be described in more detail below with reference to FIG. 8. FIG. 8 illustrates a cross-section of the first aspherical surface. The radius of curvature (Rb) of the paraxial spherical surface is a radius where the first aspherical surface is approximated to a circle using a least-square method in a region having the optical axis as its center and a diameter that is 10% of the focal length of the whole optical system of the optical system LO (for example, in a case where the focal length of the whole optical system is 30 mm, the diameter is 3 mm). In other words, the radius of curvature Rb of the paraxial spherical surface in the present specification does not always coincide with the radius of curvature at a reference spherical surface of the first aspherical surface.

Accordingly, the center of curvature of the paraxial spherical surface ("×" in FIG. 8) is determined based on the radius of curvature Rb of the paraxial spherical surface. The center of curvature in the present specification does not always coincide with the center of the reference spherical surface of the first aspherical surface, as in the case of the radius of curvature Rb of the paraxial spherical surface. The distance from the center of curvature in the direction (dotted line in FIG. 8) passing through the center of curvature at an angle of 50 degrees about the optical axis to the first aspherical surface is the distance Rr.

A technical significance of the conditional inequalities (1) to (3) will be described below.

In the optical systems LO according to the embodiments, at least one of the negative lenses G1N, G2N, and G3N has an aspherical surface (the first aspherical surface) that is in a shape where the positive refractive power increases with increase in distance from the optical axis. The first aspherical surface is an aspherical surface in a shape where the positive refractive power increases (negative refractive power decreases) with increase in distance from the optical axis, whereby aberrations that occur in the first lens unit FL, especially distortions and underlined flare components, are appropriately corrected.

When the first aspherical surface is in a shape where the positive refractive power increases with increase in distance from the optical axis, the thickness of the negative lens having the first aspherical surface can be reduced at a distant position from the optical axis. Further, since the radius of curvature Rb of the paraxial spherical surface can be also reduced, the thickness of the negative lens having the first aspherical surface can be reduced, and consequently size reduction of the whole optical system can be realized. While the first aspherical surface is on the image-side surface of the negative lens G1N in the embodiments, the above-described advantage is also produced by arranging the first aspherical surface on the negative lens G2N or the negative lens G3N.

The conditional inequality (1) defines the shape of the first aspherical surface and is for appropriately correcting field curvatures and distortions while size reduction of the whole optical system and a wide angle of view are realized.

When the radius of curvature Rb of the paraxial spherical surface of the first aspherical surface is less than the lower limit value of the conditional inequality (1) or when an aspherical surface amount of the first aspherical surface is excessively large, it becomes difficult to correct both distortions and field curvatures, which is not desirable. When the radius of curvature of the paraxial spherical surface of the first aspherical surface is greater than the upper limit value of the conditional inequality (1), the refractive power of the negative lens having the first aspherical surface is decreased. This is also not desirable since the lens thickness near the optical axis is increased when a desired angle of view is realized.

The conditional inequality (2) is for preventing increase in the lens full length and reducing or preventing aberrations (especially distortions and chromatic aberrations of magnification). When the refractive power of the second lens unit RL is lower than the lower limit value of the conditional inequality (2), the convergence effect is weakened and the lens full length is increased, which is not desirable. When the distance L1S is longer than the upper limit value of the conditional inequality (2), although the long distance L1S is advantageous for correcting aberrations, the front lens diameter (the diameter of the lens closest to the object) is undesirably increased, which is also not desirable.

The conditional inequality (3) is for appropriately correcting spherical aberrations and coma while maintaining the back focus as appropriate. When the back focus is shorter than the lower limit value of the conditional inequality (3), it becomes difficult to arrange a shutter member, for example. When the SK/f2 value exceeds the upper limit of the conditional inequality (3), the back focus becomes excessively long and it becomes difficult to correct distortions and field curvatures. Consequently, the number of lenses is increased, which is not desirable.

The numerical ranges of the conditional inequalities (1) to (3) are desirably in the ranges specified by the following conditional inequalities (1 a) to (3a):

$$0.800 < Rb/Rr < 0.992 \quad (1a),$$

$$0.87 < L1S/f2 < 1.08 \quad (2a), \text{ and}$$

$$0.49 < SK/f2 < 0.62 \quad (3a).$$

Further, the numerical ranges of the conditional inequalities (1) to (3) are more desirably in the ranges specified by the following conditional inequalities (1b) to (3b):

$$0.840 < Rb/Rr < 0.991 \quad (1b),$$

$$0.92 < L1S/f2 < 1.03 \quad (2b), \text{ and}$$

$$0.52 < SK/f2 < 0.59 \quad (3b).$$

The advantage of the aspect of the embodiments may be also produced by satisfying, instead of the conditional inequalities (2) and (3), the following conditional inequality (4):

$$1.00 < (L1S + SK)/f2 < 2.40 \quad (4).$$

In other words, the advantage of the aspect of the embodiments can be also produced by satisfying the conditional inequalities (1) and (4) at the same time.

The conditional inequality (4) is for reducing the lens full length and reducing or preventing aberrations (especially distortions and chromatic aberrations of magnification). To realize size reduction of the optical system LO and a wide angle of view at the same time, it is effective to dispose an entrance pupil position closer to the object. Further, the lens disposed at a position close to the image plane IP by reducing the back focus facilitates appropriate correction of image plane distortions and aberrations such as distortions while a wide angle of view is realized.

When the refractive power of the second lens unit RL is lower than the lower limit value of the conditional inequality (4), the convergence effect of the second lens unit RL becomes weaker, and consequently the lens full length is increased, which is not desirable. Further, since the back focus becomes excessively long, an asymmetric refractive power arrangement with respect to the stop is employed to realize a wide angle of view, which leads to increase in field curvatures, distortions, and chromatic aberrations of magnification. When the refractive power of the second lens unit RL is higher than the upper limit value of the conditional inequality (4, the radius of curvature of each lens in the second lens unit RL becomes excessively small, and consequently this results in difficulty in appropriate correction of spherical aberrations and coma by using a small number of lenses.

In a case where the advantage of the aspect of the embodiments is to be produced by an arrangement that satisfies the conditional inequalities (1) and (4) at the same time, the numerical range of the conditional inequality (1) is desirably in the numerical range defined by the conditional inequality (1a), more desirably the numerical range defined by the conditional inequality (1b). The numerical range of the conditional inequality (4) is desirably in the range defined by the following conditional inequality (4a):

$$1.60 < (L1S + SK)/f2 < 2.35 \quad (4a).$$

Further, the numerical range of the conditional inequality (4) is desirably in the range defined by the following conditional inequality (4b):

$$1.80 < (L1S + SK)/f2 < 2.31 \quad (4b).$$

Next, a desirable condition to be satisfied by the optical systems LO according to the embodiments will be described below. The optical systems LO according to the embodiments desirably satisfy one or more of the following conditional inequalities (5) to (12):

$$0.32 < f/f2 < 0.67 \quad (5),$$

$$0.90 < SK/f < 1.58 \quad (6),$$

$$-5.50 < f1/f2 < -2.10 \quad (7),$$

$$0.62 < L1S/LSL < 1.00 \quad (8),$$

$$0.10 < fG1N/f1 < 0.70 \quad (9),$$

$$0.25 < fG2N/f1 < 0.85 \quad (10),$$

$$70 < vdM < 100 \quad (11), \text{ and}$$

$$15 < vdL < 28 \quad (12).$$

In the conditional inequalities (5) to (12), f is the focal length of the whole optical system of the optical system LO (in a case where the optical system LO is a zoom lens, f is the focal length of the wide-angle end), f1 is the focal length of the first lens unit FL, LSL is the distance on the optical axis from the aperture stop SP to the lens surface of the lens closest to the image in the optical system LO, fG1N is a focal length of the negative lens G1N, fG2N is a focal length of the negative lens G2N, vdM is a maximum value of Abbe numbers of the negative lenses G1N, G2N, and G3N, and vdL is a minimum value of the Abbe numbers of the negative lenses G1N, G2N, and G3N.

The conditional inequality (5) is for reducing spherical aberrations and coma while realizing size reduction of the whole optical system. When the f/f2 value is less than the lower limit value of the conditional inequality (5), the proportion of the refractive power of the second lens unit RL with respect to the focal length of the whole optical system of the optical system LO becomes excessively small. As a result, it becomes difficult to finely realize a wide angle of view and size reduction of the optical system LO at the same time. When the f/f2 value exceeds the upper limit value of the conditional inequality (5), it becomes difficult to reduce or prevent spherical aberrations since the focal length of the second lens unit RL is excessively small to realize a wide angle of view. Consequently, it is difficult to finely realize a wide angle of view and high performance at the same time.

The conditional inequality (6) defines a so-called retro ratio. When the SK/f value is less than the lower limit value of the conditional inequality (6), the back focus becomes short, and consequently this results in difficulty in arranging a shutter member, for example. When the SK/f value exceeds the upper limit value of the conditional inequality (6), the back focus becomes excessively long, and consequently this results in difficulty in appropriate correction of distortions and field curvatures.

The conditional inequality (7) defines the focal length of the first lens unit FL having negative refractive power and the focal length of the second lens unit RL having positive refractive power. When the f1/f2 value is less than the lower limit value of the conditional inequality (7), the convergence effect of the second lens unit RL is excessively increased, and consequently this results in difficulty in reducing secondary spectra of chromatic aberrations of magnification and axial chromatic aberrations at the same time. When the f1/f2 value exceeds the upper limit value of the conditional inequality (7), the diverging effect of marginal light rays by the first lens unit FL is increased, and consequently this results in difficulty in appropriate correction of spherical aberrations and coma in the second lens unit RL.

The conditional inequality (8) defines a suitable range of the position of the aperture stop SP.

When the L1S/LSL value is less than the lower limit value of the conditional inequality (8), the distance between the aperture stop SP and the lens closest to the image is increased, which is not desirable since sufficient reduction on field curvatures becomes difficult. When the L1S/LSL value exceeds the upper limit value of the conditional inequality (8), the distance between the lens closest to the object and the aperture stop SP is increased and the front lens diameter is increased, and consequently appropriate correction of spherical aberrations and coma becomes difficult, which is not desirable.

The conditional inequality (9) is for realizing size reduction and a wide angle of view of the whole optical system.

When the fG1N/f1 value is less than the lower limit value of the conditional inequality (9), the number of lenses is increased due to difficulty in appropriate correction of field curvatures and distortions, and consequently the lens full length is increased. When the fG1N/f1 value exceeds the upper limit value of the conditional inequality (9), although it is advantageous for correction of chromatic aberrations of magnification, the front lens diameter is increased.

The conditional inequality (10) is for appropriately correcting field curvatures and astigmatisms while reducing the size of the whole optical system and increasing the angle of view. When the fG2N/f1 value is less than the lower limit value of the conditional inequality (10), the refractive power of the negative lens G2N becomes excessively strong. This is advantageous for size reduction, but it becomes difficult to appropriately correct field curvatures and astigmatisms. When the fG2N/f1 value exceeds the upper limit value of the conditional inequality (10), the refractive power of the negative lens G2N becomes excessively weak, and consequently the front lens diameter is increased.

The conditional inequality (11) is for reducing or preventing axial chromatic aberrations and chromatic aberrations of magnification while decreasing the lens full length. When the vdM value is less than the lower limit value of the conditional inequality (11), chromatic aberrations increase, and consequently appropriate correction of aberrations in the whole optical system becomes difficult. When the vdM value exceeds the upper limit value of the conditional inequality (11), although it is advantageous for reducing or preventing axial chromatic aberrations and chromatic aberrations of magnification, desired refractive power becomes difficult to realize as an optical material.

The conditional inequality (12) is for reducing a secondary spectrum of chromatic aberrations of magnification.

When the vdL value is less than the lower limit value of the conditional inequality (12), although it is advantageous for correction of secondary spectra of axial chromatic aberrations and chromatic aberrations of magnification, first-order achromatism is not appropriately performed, and consequently the size of the whole optical system is increased.

When the vdL value exceeds the upper limit value of the conditional inequality (12), although it is advantageous for reduction or preventing of chromatic aberrations of magnification, realizing desired characteristics due to secondary dispersion becomes difficult.

The numerical ranges of the conditional inequalities (5) to (12) are desirably in the ranges specified by the following conditional inequalities (5a) to (12a):

$$0.37 < f/f2 < 0.62 \quad (5a),$$

$$0.94 < SK/f < 1.41 \quad (6a),$$

$$-5.30 < f1/f2 < -2.21 \quad (7a),$$

$$0.65 < L1S/LSL < 0.97 \quad (8a),$$

$$0.13 < fG1N/f1 < 0.69 \quad (9a),$$

$$0.27 < fG2N/f1 < 0.79 \quad (10a),$$

$$74 < vdM < 98 \quad (11a), \text{ and}$$

$$17 < vdL < 26 \quad (12a).$$

The numerical ranges of the conditional inequalities (5) to (12) are more desirably in the ranges specified by the following conditional inequalities (5b) to (12b):

$$0.38 < f/f2 < 0.60 \quad (5b),$$

$$0.97 < SK/f < 1.37 \quad (6b),$$

$$-5.15 < f1/f2 < -2.36 \quad (7b),$$

$$0.67 < L1S/LSL < 0.94 \quad (8b),$$

$$0.14 < fG1N/f1 < 0.67 \quad (9b),$$

$$0.28 < fG2N/f1 < 0.77 \quad (10b),$$

$$81 < vdM < 96 \quad (11b), \text{ and}$$

$$20 < vdL < 24 \quad (12b).$$

Next, the optical systems LO according to the embodiments will be described in detail below.

In the optical systems LO according to the embodiments, the second lens unit RL is moved toward the object in focusing from infinity to short distance.

Every lens of the first lens unit FL that is on the object side of a maximum air interval in the first lens unit FL is referred as a first partial optical system FLA, and every lens of the first lens unit FL that is on the image side of the maximum air interval in the first lens unit FL is referred as a second partial optical system FLB. In this case, the first partial optical system FLA consists of two negative lenses (the negative lenses G1N and G2N). With this structure, both a wide angle of view and high performance are finely realized. Furthermore, a surface of the lens closest to the object in the second partial optical system FLB is concave toward the object. With the concave surface, flare components at the periphery of a screen are reduced.

In the first embodiment, since the focal length of the whole optical system of the optical system LO is 12.35 mm, the range of a diameter of 1.235 mm passing through the optical axis is used in calculating the radius of curvature Rb. In the second embodiment, the range of a diameter of 1.442 mm passing through the optical axis is used in calculating the radius of curvature Rb. In the third embodiment, the range of a diameter of 1.948 mm passing through the optical axis is used in calculating the radius of curvature Rb.

Since lenses adjacent to the aperture stop SP are cemented together to form a cemented lens as in the embodiments, the Petzval sum is appropriately corrected and field curvatures can be reduced or prevented.

In addition, it is desirable to dispose the first aspherical surface on the image-side surface of the negative lens G1N as in the optical systems LO according to the embodiments. Since the first aspherical surface lens has an aspherical shape where positive refractive power increases at a peripheral portion, field curvatures can be effectively corrected after distortions are appropriately corrected. Further, since increase in the thickness of the periphery in the optical axis direction is reduced or prevented, increase in the front diameter can be reduced or prevented. It is further desirable that the negative lens G1N is disposed at a position closest to the object in the optical system LO. It is because the incidence height of off-axis light rays becomes highest when the wide angle lens is used for the lens closest to the object, and consequently the effect of correcting field curvatures and off-axis coma at the periphery of the screen is increased. Accordingly, when a wide angle of view is realized, size reduction is also achieved while aberrations are appropriately reduced.

The lens on the object side of the aperture stop SP is desirably convex toward the image side, and the lens on the image side of the aperture stop SP is desirably convex toward the object side, as in the optical systems LO according to the embodiments. Arranging a lens surface having a strong concave shape toward a stop is advantageous for reduction or prevention of aberrations associated with increase in aperture, but reduction of sagittal flare (off-axis sagittal coma components) still remains an issue. Thus, by the configuration according to the present embodiment in which the lens on the object side has a convex shape toward the image while the lens on the image side has a convex shape toward the object as in the present embodiment, a sagittal flare can be reduced or prevented while spherical aberrations and coma are appropriately corrected.

By the configuration according to the first to third embodiments in which lenses adjacent to the aperture stop SP are formed to a cemented lens, correction of spherical aberrations and coma and correction of the Petzval sum are both realized.

First to third numerical embodiments corresponding to the first to third embodiments will be described below.

In plane data about the numerical embodiments, r is the radius of curvature at the optical surface, and d (mm) is the axial interval (distance on the optical axis) between the mth and (m+1)th planes, where m is the number of the plane as counted from the light incidence side. Further, nd is the refractive index of the optical member at the d-line, and vd is the Abbe number of the optical member. The Abbe number vd of a material is expressed by the following equation:

$$vd=(Nd-1)/(NF-NC),$$

where Nd, NF, NC, and Ng are the refractive indexes at the d-line (587.6 nm), F-line (486.1 nm), C-line (656.3 nm), and g-line (wavelength: 435.8 nm) of the Fraunhofer lines.

In each numerical embodiment, the values of d, focal length (mm), F-number, and half angle of view (degrees) are values at the time when the optical system LO of each embodiment is focused on an object at infinity. The back focus SK is the air equivalent distance from the last lens surface to the image plane. The lens full length is the value obtained by adding the back focus to the distance from the first lens surface to the last lens surface.

The symbol "*" is added to the right-hand side of each plane number of an optical surface that is an aspherical surface. The aspherical surface is expressed by the following equation:

$$x=(h^2/R)/[1+\{1-(1+k)(h/R)^2\}^{1/2}]+A4\times h^4+A6\times h^6+A8\times h^8+A10\times h^{10}+A12\times h^{12},$$

where x is the amount of displacement from the surface vertex in the optical axis direction, h is the height from the optical axis in the direction perpendicular to the optical axis, R is the radius of curvature of the paraxial spherical surface, k is a conic constant, and A4, A6, A8, A10, and A12 are aspherical surface coefficients of respective orders. In each aspherical surface coefficient, "e±XX" refers to "×10±$^{XX}$".

Numerical Embodiment 1

Unit: mm

Plane Data

| Plane No. | r | d | Nd | vd | Effective Diameter |
|---|---|---|---|---|---|
| 1* | 160.174 | 2.50 | 1.58313 | 59.4 | 35.21 |
| 2* | 12.313 | 3.75 | | | 23.39 |
| 3 | 19.395 | 1.50 | 1.49700 | 81.5 | 22.08 |
| 4 | 10.121 | 11.53 | | | 17.14 |
| 5 | −10.896 | 1.45 | 1.64000 | 60.1 | 9.89 |
| 6 | −9.218 | 1.00 | 1.80518 | 25.4 | 9.67 |
| 7 | −17.732 | 0.20 | | | 9.80 |
| 8 | 167.148 | 4.43 | 1.76182 | 26.5 | 10.35 |
| 9 | −9.610 | 1.00 | 1.92286 | 20.9 | 11.08 |
| 10 | −16.471 | 2.45 | | | 11.70 |
| 11 (Stop) | ∞ | 2.61 | | | 11.78 |
| 12 | 20.673 | 3.35 | 1.71736 | 29.5 | 11.85 |
| 13 | −23.924 | 1.20 | 1.83400 | 37.2 | 11.43 |
| 14 | 10.052 | 6.57 | 1.56384 | 60.7 | 12.16 |
| 15 | −44.138 | 0.15 | | | 14.73 |
| 16 | 57.338 | 2.02 | 1.69350 | 50.8 | 15.86 |
| 17 | −811.759 | 0.15 | | | 16.35 |
| 18 | 30.251 | 7.15 | 1.43875 | 94.7 | 17.19 |
| 19 | −14.611 | 0.20 | | | 17.76 |
| 20 | −26.208 | 1.00 | 1.91082 | 35.3 | 17.01 |
| 21 | 20.621 | 7.62 | 1.49700 | 81.5 | 17.52 |
| 22 | −14.416 | 0.15 | | | 18.53 |
| 23* | −29.485 | 1.70 | 1.80625 | 40.9 | 18.41 |
| 24* | −144.804 | 16.54 | | | 21.01 |
| Image Plane | ∞ | | | | |

-continued

Unit: mm

Aspherical Surface Data

1st Surface

K = −1.70102e+001
A4 = 6.59643e−005
A6 = −2.74745e−007
A8 = 6.80017e−010
A10 = −9.63328e−013
A12 = 5.97567e−016

2nd Surface

K = −4.02034e−001
A4 = 2.55727e−005
A6 = 4.21826e−007
A8 = −3.74213e−009
A10 = −1.42096e−011
A12 = 5.42009e−014

23rd Surface

K = −1.64175e−002
A4 = −1.35194e−004
A6 = −5.37724e−007
A8 = 1.29614e−008
A10 = −1.99767e−010
A12 = 9.07686e−013

24th Surface

K = −2.91625e+003
A4 = −1.02443e−004
A6 = 1.47875e−006
A8 = −1.22809e−008
A10 = 5.77510e−011
A12 = −8.83148e−014

Various Items of Data

| | |
|---|---|
| Focal Length | 12.35 |
| F number | 2.88 |
| Half Angle of View (degrees) | 60.28 |
| Image Height | 21.64 |
| Lens Full Length | 80.22 |
| SK | 16.54 |

Lens Unit Data

| Unit | Starting Surface | Focal Length | Lens Structure Length | Front Principal Point Position | Rear Principal Point Position |
|---|---|---|---|---|---|
| 1 | 1 | −158.02 | 27.37 | −87.57 | −264.72 |
| 2 | 11 | 31.35 | 33.87 | 7.27 | −17.25 |

Numerical Embodiment 2

Unit: mm

Plane Data

| Plane No. | r | d | Nd | vd | Effective Diameter |
|---|---|---|---|---|---|
| 1* | 82.756 | 2.92 | 1.59201 | 67.0 | 35.72 |
| 2* | 12.372 | 4.57 | | | 23.68 |
| 3 | 21.515 | 1.18 | 1.43700 | 95.1 | 22.27 |
| 4 | 11.286 | 12.00 | | | 18.11 |
| 5 | −12.270 | 1.70 | 1.80518 | 25.4 | 10.42 |
| 6 | −21.078 | 0.23 | | | 10.56 |
| 7 | 141.180 | 4.06 | 1.76182 | 26.5 | 11.14 |
| 8 | −10.760 | 1.17 | 1.86966 | 20.0 | 11.77 |
| 9 | −19.730 | 2.30 | | | 12.41 |
| 10 (Stop) | ∞ | 3.06 | | | 12.62 |
| 11 | 24.295 | 2.98 | 1.71736 | 29.5 | 12.87 |
| 12 | −65.853 | 1.40 | 1.83400 | 37.2 | 12.99 |
| 13 | 11.575 | 8.03 | 1.56384 | 60.7 | 14.04 |
| 14 | −108.349 | 0.18 | | | 17.52 |
| 15 | 130.627 | 2.79 | 1.69350 | 50.8 | 18.37 |
| 16 | −59.828 | 0.18 | | | 19.16 |
| 17 | 39.992 | 8.19 | 1.43875 | 94.7 | 20.47 |
| 18 | −16.891 | 0.23 | | | 21.14 |
| 19 | −27.964 | 1.15 | 1.91082 | 35.3 | 20.25 |
| 20 | 39.183 | 6.83 | 1.49700 | 81.5 | 20.94 |
| 21 | −18.801 | 0.18 | | | 21.66 |
| 22* | −34.154 | 2.00 | 1.80625 | 40.9 | 21.55 |
| 23* | −96.071 | 2.38 | | | 23.84 |
| 24 | −28.506 | 4.59 | 1.49700 | 81.5 | 24.14 |
| 25 | −21.803 | 17.29 | | | 26.79 |
| Image Plane | ∞ | | | | |

Aspherical Surface Data

1st Surface

K = −2.88105e+000
A4 = 4.13105e−005
A6 = −1.31037e−007
A8 = 2.78457e−010
A10 = −3.61787e−013
A12 = 2.38355e−O16

2nd Surface

K = −4.87711e−001
A4 = 2.35558e−005
A6 = 1.88364e−007
A8 = −6.66822e−010
A10 = −8.27640e−012
A12 = 6.41862e−015

22nd Surface

K = −5.35923e+000
A4 = −8.06317e−005
A6 = −1.66406e−007
A8 = 3.00434e−009
A10 = −3.24408e−011
A12 = 1.13006e−013

23rd Surface

K = −5.27820e+002
A4 = −5.82046e−005
A6 = 6.81299e−007
A8 = −4.15659e−009
A10 = 1.42969e−011
A12 = −1.59805e−014

Various Items of Data

| | |
|---|---|
| Focal Length | 14.42 |
| F number | 2.88 |
| Half Angle of View (degrees) | 56.32 |
| Image Height | 21.64 |
| Lens Full Length | 91.61 |
| BF | 17.29 |

Lens Unit Data

| Unit | Starting Surface | Focal Length | Lens Structure Length | Front Principal Point Position | Rear Principal Point Position |
|---|---|---|---|---|---|
| 1 | 1 | −75.85 | 27.84 | −32.11 | −108.47 |
| 2 | 10 | 32.48 | 44.18 | 16.67 | −21.36 |

Numerical Embodiment 3

Unit: mm

Plane Data

| Plane No. | r | d | Nd | vd | Effective Diameter |
|---|---|---|---|---|---|
| 1* | 25.342 | 3.00 | 1.58313 | 59.4 | 33.51 |
| 2* | 14.122 | 3.46 | | | 26.63 |
| 3 | 29.292 | 1.80 | 1.49700 | 81.5 | 26.35 |
| 4 | 11.856 | 12.83 | | | 20.00 |
| 5 | −12.937 | 3.22 | 1.85025 | 30.1 | 15.10 |
| 6 | −15.249 | 0.24 | | | 15.95 |
| 7 | −200.509 | 3.72 | 1.80100 | 35.0 | 14.39 |
| 8 | −15.617 | 1.20 | 1.84666 | 23.8 | 13.66 |
| 9 | −36.408 | 4.63 | | | 13.33 |
| 10 (Stop) | ∞ | 3.14 | | | 13.80 |
| 11 | 20.251 | 1.44 | 1.83400 | 37.2 | 16.44 |
| 12 | 11.001 | 8.05 | 1.63930 | 44.9 | 16.50 |
| 13 | 40.694 | 1.18 | | | 18.24 |
| 14 | 155.426 | 3.99 | 1.69350 | 50.8 | 18.63 |
| 15 | −27.801 | 0.18 | | | 19.53 |
| 16 | 81.976 | 8.47 | 1.43875 | 94.7 | 20.22 |
| 17 | −15.645 | 0.24 | | | 20.66 |
| 18 | −17.819 | 1.20 | 1.91082 | 35.3 | 19.75 |
| 19 | −250.091 | 7.18 | 1.49700 | 81.5 | 20.90 |
| 20 | −17.166 | 0.18 | | | 22.07 |
| 21* | −22.669 | 2.04 | 1.80625 | 40.9 | 21.84 |
| 22* | −56.175 | 19.35 | | | 24.19 |
| Image Plane | ∞ | | | | |

Aspherical Surface Data $1^{st}$ Surface

K = −8.90390e+000
A4 = 5.91999e−005
A6 = −1.70738e−007
A8 = 1.68461e−010
A10 = 1.21343e−014
A12 = −7.49910e−017

$2^{nd}$ Surface

K = −2.93186e−001
A4 = −1.59637e−005
A6 = 2.62791e−007
A8 = −3.57001e−009
A10 = 9.14497e−012
A12 = −1.27953e−014

$21^{st}$ Surface

K = −8.14803e+000
A4 = −1.38033e−004
A6 = 6.19691e−007
A8 = −2.86432e−009
A10 = −2.05613e−012
A12 = 3.57786e−014

$22^{nd}$ Surface

K = −9.60118e+001
A4 = −6.64025e−005
A6 = 8.32589e−007
A8 = −4.89855e−009
A10 = 1.68427e−011
A12 = −2.17370e−014

Various Items of Data

| Focal Length | 19.48 |
|---|---|
| F number | 2.88 |
| Half Angle of View (degrees) | 48.02 |
| Image Height | 21.65 |
| Lens Full Length | 90.74 |
| BF | 19.35 |

Unit: mm

Zoom Lens Unit Data

| Unit | Starting Surface | Focal Length | Lens Structure Length | Front Principal Point Position | Rear Principal Point Position |
|---|---|---|---|---|---|
| 1 | 1 | −93.31 | 29.47 | −29.05 | −88.54 |
| 2 | 10 | 33.23 | 37.29 | 5.92 | −20.82 |

Various values in the respective numerical embodiments are collectively shown in Table 1 below.

TABLE 1

| | Embodiment 1 | Embodiment 2 | Embodiment 3 |
|---|---|---|---|
| F | 12.350 | 14.420 | 19.481 |
| f1 | −158.021 | −75.847 | −93.310 |
| f2 | 31.348 | 32.476 | 33.230 |
| TD | 63.679 | 74.320 | 71.393 |
| SK | 16.544 | 17.294 | 19.350 |
| Rb | 12.313 | 12.363 | 14.133 |
| Rr | 12.443 | 12.527 | 16.778 |
| L1S | 29.812 | 30.142 | 34.101 |
| LSL | 33.867 | 44.178 | 37.291 |
| fG1N | −23.017 | −24.957 | −60.669 |
| fG2N | −45.003 | −56.294 | −41.500 |
| fG3N | −25.163 | −39.914 | −279.280 |
| LD | 80.223 | 91.614 | 90.742 |
| (1) Rb/Rr | 0.990 | 0.987 | 0.842 |
| (2) L1S/f2 | 0.951 | 0.928 | 1.026 |
| (3) SK/f2 | 0.528 | 0.533 | 0.582 |
| (4) (L1S + SK)/f2 | 2.031 | 2.288 | 2.148 |
| (5) f/f2 | 0.394 | 0.444 | 0.586 |
| (6) SK/f | 1.340 | 1.199 | 0.993 |
| (7) f1/f2 | −5.041 | −2.335 | −2.808 |
| (8) L1S/LSL | 0.880 | 0.682 | 0.914 |
| (9) fG1N/f1 | 0.146 | 0.329 | 0.650 |
| (10) fG2N/f1 | 0.285 | 0.742 | 0.445 |
| (11) vdM | 81.54 | 95.10 | 81.54 |
| (12) vdL | 20.88 | 20.02 | 23.78 |

[Image Pickup Apparatus]

Figure 7:
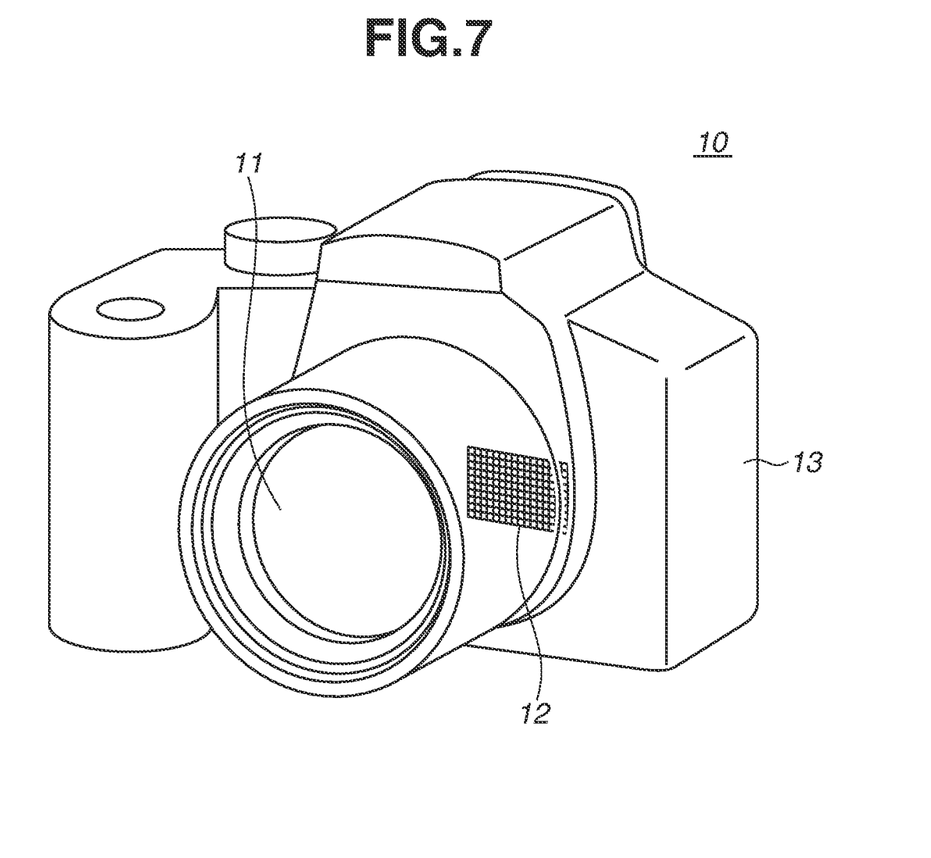
FIG. 7 is a schematic view illustrating an image pickup apparatus.

Next, a digital still camera (image pickup apparatus) 10 using an optical system according to an embodiment of the disclosure as an image pickup optical system will be described below with reference to FIG. 7. In FIG. 7, a camera main body 13 and an image pickup optical system 11 including an optical system according to any one of the first to third embodiments are illustrated. A solid-state image pickup element (photoelectric conversion element) 12, such as a CCD sensor or CMOS sensor, is built in the camera main body 13 and receives an optical image formed by the image pickup optical system 11 and photoelectrically converts the received image. The camera main body 13 can be a single-lens reflex camera including a quick-turn mirror or a mirrorless camera without a quick-turn mirror.

An application of an optical system according to an embodiment of the disclosure to an image pickup apparatus such as a digital still camera realizes an image pickup apparatus that is small in size and yet has high optical performance.

According to an embodiment of the disclosure, an image pickup apparatus that is small in size and yet has high optical performance can be realized.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2019-171676, filed Sep. 20, 2019, which is hereby incorporated by reference herein in its entirety.

What is claimed is:

1. An optical system comprising, in this order from an object side to an image side:
a first lens unit, an aperture stop, and a second lens unit having a positive refractive power,
wherein the first lens unit includes at least three negative lenses including in order from the object side to the image side, a first negative lens (G1N), a second negative lens (G2N), and a third negative lens (G3N),
wherein the second lens unit includes all lenses disposed on the image side of the aperture stop,
wherein at least one lens surface of the first negative lens (G1N), the second negative lens (G2N), and the third negative lens (G3N) is an aspherical surface, and
wherein the following conditional inequalities are satisfied:

$0.700 < Rb/Rr < 0.994$, $0.80 < L1S/f2 < 1.20$, and $0.45 < SK/f2 < 0.65$, where Rb is a radius of curvature of a paraxial spherical surface of the aspherical surface, Rr is a distance between a center of curvature of the paraxial spherical surface of the aspherical surface and the aspherical surface in a direction of an angle of 50 degrees with respect to an optical axis, L1S is a distance from a vertex of a lens surface closest to an object in the first lens unit to the aperture stop, f2 is a focal length of the second lens unit that includes the all lenses disposed on the image side of the aperture stop, and SK is a back focus of the optical system.

2. The optical system according to claim 1, wherein the following conditional inequality is satisfied:

$0.32 < f/f2 < 0.67$, where f is a focal length of the optical system.

3. The optical system according to claim 1, wherein the following conditional inequality is satisfied:

$0.90 < SK/f < 1.58$, where f is the focal length of the optical system.

4. The optical system according to claim 1, wherein the first lens unit has a negative refractive power, and the following conditional inequality is satisfied:

$-5.50 < f1/f2 < -2.10$, where f1 is a focal length of the first lens unit.

5. The optical system according to claim 1, wherein the following conditional inequality is satisfied:

$0.62 < L1S/LSL < 1.00$, where LSL is a distance on the optical axis from the aperture stop to a lens surface closest to an image in the optical system.

6. The optical system according to claim 1, wherein the first lens unit has a negative refractive power, and the following conditional inequality is satisfied:

$0.10 < fG1N/f1 < 0.70$, where fG1N is a focal length of the first negative lens (G1N).

7. The optical system according to claim 1, wherein the first lens unit has a negative refractive power, and the following conditional inequality is satisfied:

$0.25 < fG2N/f1 < 0.85$, where fG2N is a focal length of the second negative lens (G2N).

8. The optical system according to claim 1, wherein the following conditional inequality is satisfied:

$70 < vdM < 100$, where vdM is a maximum value of an Abbe number of the first negative lens (G1N), the second negative lens (G2N), and the third negative lens (G3N).

9. The optical system according to claim 1, wherein the following conditional inequality is satisfied:

$15 < vdL < 28$, where vdL is a minimum number of the Abbe number of the first negative lens (G1N), the second negative lens (G2N), and the third negative lens (G3N).

10. The optical system according to claim 1, wherein the first lens unit consists of a first partial optical system including every lens disposed on an object side of a maximum air interval in the first lens unit and a second partial optical system including every lens disposed on an image side of the maximum air interval, and the first partial optical system consists of the first negative lens (G1N) and the second negative lens (G2N).

11. The optical system according to claim 10, wherein a lens surface closest to the object in the second partial optical system is concave to the object.

12. The optical system according to claim 1, wherein the aspherical surface is an image-side surface of the first negative lens (G1N).

13. The optical system according to claim 12, wherein the first negative lens (G1N) is disposed at a position closest to the object in the first lens unit.

14. An image pickup apparatus comprising:
an optical system; and
an image pickup element configured to photoelectrically convert an optical image formed by the optical system,
wherein the optical system comprising in this order from an object side to an image side, a first lens unit, an aperture stop, and a second lens unit having a positive refractive power,
wherein the first lens unit includes at least three negative lenses including in order from the object side to the image side, a first negative lens (G1N), a second negative lens (G2N), and a third negative lens (G3N),
wherein the second lens unit includes all lenses disposed on the image side of the aperture stop,
wherein at least one lens surface of the first negative lens (G1N), the second negative lens (G2N), and the third negative lens (G3N) is an aspherical surface, and
wherein the following conditional inequalities are satisfied:

$0.700 < Rb/Rr < 0.994$, $0.80 < L1S/f2 < 1.20$, and $0.45 < SK/f2 < 0.65$, where Rb is a radius of curvature of a paraxial spherical surface of the aspherical surface, Rr is a distance between a center of curvature of the paraxial spherical surface of the aspherical surface and the aspherical surface in a direction of an angle of 50 degrees with respect to an optical axis, L1S is a distance from a vertex of a lens surface closest to an object in the first lens unit to the aperture stop, f2 is a focal length of the second lens unit that includes the all lenses disposed on the image side of the aperture stop, and SK is a back focus of the optical system.

15. The image pickup apparatus according to claim 14, wherein the following conditional inequality is satisfied:

$$0.32 < f/f2 < 0.67,$$

where f is a focal length of the optical system.

16. The image pickup apparatus according to claim 14, wherein the following conditional inequality is satisfied:

$$0.90 < SK/f < 1.58,$$

where f is the focal length of the optical system.

17. The image pickup apparatus according to claim 14, wherein the first lens unit has a negative refractive power, and the following conditional inequality is satisfied:

$$-5.50 < f1/f2 < -2.10,$$

where f1 is a focal length of the first lens unit.

18. The image pickup apparatus according to claim 14, wherein the following conditional inequality is satisfied:

$$0.62 < L1S/LSL < 1.00,$$

where LSL is a distance on the optical axis from the aperture stop to a lens surface closest to an image in the optical system.

19. The image pickup apparatus according to claim 14, wherein the first lens unit has a negative refractive power, and the following conditional inequality is satisfied:

$$0.10 < fG1N/f1 < 0.70,$$

where fG1N is a focal length of the first negative lens (G1N).

20. The image pickup apparatus according to claim 14, wherein the first lens unit has a negative refractive power, and the following conditional inequality is satisfied:

$$0.25 < fG2N/f1 < 0.85,$$

where fG2N is a focal length of the second negative lens (G2N).

* * * * *